US010334866B2

(12) United States Patent
Haniszewski et al.

(10) Patent No.: US 10,334,866 B2
(45) Date of Patent: Jul. 2, 2019

(54) HANDHELD ASSEMBLY AND METHOD FOR UNIFORM DECORATION OF THE SIDEWALL FOR FOODSTUFF

(71) Applicants: Rosina Haniszewski, North Tonawanda, NY (US); Joseph R. Haniszewski, Sr., North Tonawanda, NY (US)

(72) Inventors: Rosina Haniszewski, North Tonawanda, NY (US); Joseph R. Haniszewski, Sr., North Tonawanda, NY (US)

( * ) Notice: Subject to any disclaimer, the term of this patent is extended or adjusted under 35 U.S.C. 154(b) by 284 days.

(21) Appl. No.: 15/335,814

(22) Filed: Oct. 27, 2016

(65) Prior Publication Data
US 2018/0116243 A1 May 3, 2018

(51) Int. Cl.
A23G 3/20 (2006.01)
A23G 3/34 (2006.01)
A23G 3/28 (2006.01)
B05B 7/00 (2006.01)
B05B 7/14 (2006.01)
B05B 1/02 (2006.01)
B05B 12/00 (2018.01)
B05B 12/32 (2018.01)

(52) U.S. Cl.
CPC ......... A23G 3/2076 (2013.01); A23G 3/0085 (2013.01); A23G 3/0097 (2013.01); A23G 3/28 (2013.01); B05B 7/0081 (2013.01); B05B 7/1413 (2013.01); B05B 7/1486 (2013.01); B05B 1/02 (2013.01); B05B 12/002 (2013.01); B05B 12/32 (2018.02)

(58) Field of Classification Search
CPC ....... B05C 19/00; B05C 19/008; B05C 19/04; B05C 19/06; B05C 21/005; A23G 3/0097; A23G 3/2076; A23G 3/28; A23G 3/0085; B05B 7/1486; B05B 7/1413; B05B 7/0081; B05B 12/32; B05B 12/002; B05B 1/02; B05B 14/48; B05B 9/01
USPC ...... 118/13, 14, 24, 301, 308; 239/376–379, 239/436; 222/175, 389, 394
See application file for complete search history.

(56) References Cited

U.S. PATENT DOCUMENTS 3,921,858 A 11/1975 Bemm
4,288,036 A * 9/1981 Jubinville ............. B05B 7/1209
239/345

(Continued)

Primary Examiner — Laura Edwards
(74) Attorney, Agent, or Firm — Vincent G. LoTempio; David T. Stephenson; Kloss, Stenger & LoTempio

(57) ABSTRACT

An assembly and method for uniform decoration of the sidewall for foodstuff coats a sidewall of a baked foodstuff, such as a cake, with a plurality of decorative granular members, while restricting coating the top region of the baked foodstuff with the decorative granular members. A spray gun variably coats the foodstuff with decorative granular members at controllable rates of discharge, while at least one shield blocks the decorative granular members from the top region of the foodstuff, such that only the sidewall is coated with decorative granular members. A fan generates air flow to blow the decorative granular members through a conduit in the housing, and out through an outlet. A screen positions coplanar and adjacent to the fan to prevent backflow of granular members into the fan. The at least one shield is rectangular or curved to accommodate a rectangular-shaped cake or a disc-shaped cake.

13 Claims, 10 Drawing Sheets

(56) References Cited

U.S. PATENT DOCUMENTS

| | | | |
|---|---|---|---|
| 6,047,858 A | 4/2000 | Romer | |
| 6,733,809 B2 | 5/2004 | Zimmerman | |
| 2009/0078790 A1* | 3/2009 | Camilleri | B05B 7/2478 |
| | | | 239/345 |
| 2009/0110803 A1* | 4/2009 | Mather | B05B 15/55 |
| | | | 427/8 |
| 2011/0210190 A1* | 9/2011 | Yang | F26B 21/004 |
| | | | 239/462 |

* cited by examiner

HANDHELD ASSEMBLY AND METHOD FOR UNIFORM DECORATION OF THE SIDEWALL FOR FOODSTUFF

FIELD OF THE INVENTION

The present invention relates generally to a handheld assembly and method for uniform decoration of the sidewall for foodstuff. More so, the present invention relates to a handheld assembly and method for coating a sidewall of a baked foodstuff with a plurality of decorative granular members; whereby the assembly comprises a spray gun for discharging the decorative granular members, and a reloadable container that gravity feeds the decorative granular members into a conduit of the spray gun; whereby a fan blows the edible members through the conduit and out a discharge tip; whereby the rate of release of decorative granular members from the reloadable container and the speed of the fan are simultaneously adjustable with at least one switch; and whereby the assembly further comprises at least one shield sized and dimensioned for a specific baked foodstuff is positioned adjacent to the corresponding baked foodstuff to block discharged decorative granular members from engaging a portion of the baked foodstuff other than the sidewall.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, decorating a baked foodstuff, such as a cake or cupcake, requires the use of icing or frosting and other edible decorative elements to make plain cakes more visually interesting. Decorating the cake usually involves covering it with some form of icing and then using decorative sugar, candy, chocolate or icing decorations to embellish the cake. Decorating the cake can also include sprinkling a fine coat of icing sugar or drizzling a glossy blanket of glaze over the top of a cake.

Generally, a cake decorator uses, for manual distribution of these granular ingredients on the cakes, a simple device provided with a tray for collecting the granular ingredient. An idle rotating plate is situated in the center of this tray, on top of a support stem, and receives a cake to be decorated, arranged on top. The operator turns the cake with one hand and with the other hand picks up a certain quantity of granular ingredient from the tray and moving the hand closer fills up the sides of the cake with this ingredient so that the cake, during its rotational movement, incorporates part of this ingredient into the outer layer coated with a layer of cream.

It is known in the art that a type of decoration which is widely used for cakes or for similar confectionery products consists in ingredients in granular form distributed over parts of cakes previously coated, for example, with a layer of cream. Distribution of such granular and edible decorations may be performed both on the top portion of the cakes and on the side portion thereof.

Application of the granular ingredients onto the top part of the cakes does not require any special operations since it is easy to perform. Application, however, of this type of ingredient onto side portions of the cake which are generally vertical or in any case inclined is more difficult since it requires good manual skill and expertise. However in many instances, it is required to perform distribution solely over the sides of the cake, leaving the top part free of the granular ingredient.

At present, also in the case of production on an industrial level, this type of decoration is performed mainly by means of manual operations and more rarely using semi-automatic systems, which nevertheless require dedicated and specialized labor. This automatic system has numerous drawbacks. Firstly, with said system it is possible to obtain only a band of granular product with a limited and non-uniform height since the mound of granular product is unable to provide a vertical wall of granular product facing the cake. Secondly, large quantities of granular product fall from the cakes, also as a result of the movement of the conveyor belt, with the consequent need for recovery and recycling of the said granular product.

Other proposals have involved decorating the sidewalls of cakes. The problem with these decorating systems and methods is that they do not provide a means for decorating the sidewall of a cake is that they do not magnify the force applied around the hose, and they are not compactable for facilitated stowage and transport. Also, the handle used to control the gripping device is not easily accessible. Even though the above cited gripping devices meets some of the needs of the market, an assembly and method to coat a sidewall of a baked foodstuff, such as a cake, with a plurality of decorative granular members, while restricting coating other regions of the baked foodstuff, like the top region of the cake, with the decorative granular members is still desired.

SUMMARY

Illustrative embodiments of the disclosure are generally directed to an assembly and method for uniform decoration of the sidewall for foodstuff. In some embodiments, the assembly serves to coat a sidewall of a baked foodstuff, such as a cake, with a plurality of decorative granular members, while restricting coating other regions of the baked foodstuff, like the top region of the cake, with the decorative granular members. In one possible embodiment of the assembly, a spray gun variably coats the foodstuff with decorative granular members at controllable rates of discharge, while at least one shield blocks the decorative granular members from the top region of the foodstuff, such that only the sidewall is coated with decorative granular members.

In some embodiments, assembly comprises a spray gun and at least one shield that work together to simultaneously regulate the rate of discharge of decorative granular members from the spray gun, while blocking the discharge of the decorative granular members onto other regions of the baked foodstuff, such as a top region or a back region of the foodstuff.

By regulating the rate of discharge, a uniform coating of the sidewall is possible. By blocking the path of discharge of decorative granular members on the top or back regions, greater control over the ornamental aspects of the baked foodstuff is possible. Further, waste from randomly discharged decorative granular members is also minimized, as the rate of discharge is controlled, and the path of discharged decorative granular members is blocked from undesirable areas.

In some embodiments, the assembly comprises a spray gun for discharging the decorative granular members. The spray gun comprises a housing having a wide rear end and a narrow front end. The front end forms an outlet for discharge of the decorative granular members. A conduit is coaxially and longitudinally disposed through the housing from the rear end to the front end of the housing. The conduit is configured to carry decorative granular members. In an alternative embodiment, a deflector is disposed longitudinally through the conduit. The deflector helps guide the decorative granular members.

The housing further comprises a middle portion between the rear end and the front end. The middle portion forms an upper inlet that is in communication with the conduit. A handle may extend from the rear end or middle portion of the housing to enable manipulation of the housing.

In some embodiments, the spray gun further comprises a container that detachably attaches to the housing. The container comprises an end wall and a continuous sidewall extending from the end wall and terminating at an opening. The end wall and the continuous sidewall are defined by a cavity that is sized and dimensioned to contain the decorative granular members. The container is configured to detachably couple to the middle portion of the housing, such that the opening of the container is in communication with the upper inlet of the housing through a regulation valve. In this arrangement, the container is above the housing, such that the decorative granular members are gravity fed into the conduit.

A plurality of dispensing tips may detachably attach to the outlet at the front end of the housing. The dispensing tips have various shapes and dimensions so as to be used to create different shape or discharge patterns for the decorative granular members.

In some embodiments, a regulation valve is operational to variably open and close the communication between the opening of the container and the upper inlet of the housing. The regulation valve regulates the rate of decorative granular members allowed to fall into the conduit. The regulation valve is rotatable, slidable, pivotable, or rolls to move between an open position, a closed position, and a position to partially obstruct the decorative granular members falling from the container into the conduit. The position of the regulation valve may be controlled manually or from at least one switch located in another area of the spray gun.

In some embodiments, a fan is disposed at the rear end of the housing. The fan generates air flow through the conduit, from the rear end to the outlet at the front end of the housing. The fan generates sufficient air flow to carry the falling decorative granular members past the opening in the container, and out through the outlet at the front end of the housing. In one alternative embodiment, a screen positions coplanar, and adjacent to the fan. The screen may restrict backflow of decorative granular members into the fan. In one embodiment, the powering on and off of the fan, and the air flow velocity generated by the fan is controllable with at least one switch.

The at least one switch operatively connects to the fan, or the regulation valve, or both. The switch is configured to control the rate of the fan, or the position of the regulation valve, or both the rate and the position. In some embodiments, the switch may be disposed at the handle, such that the fan may be controlled simultaneously with the rate of discharge of decorative granular members through the regulation valve.

In one embodiment, the switch is a trigger at the handle. The trigger powers on and off the fan. The switch may also include a second trigger that controls the position of the regulation valve. In one embodiment, a power source powers the fan, or the regulation valve, or both. A circuitry may be used to operatively connect the at least one switch to the fan and regulation valve.

The assembly further comprises at least one shield that works in conjunction with the spray gun to coat the sidewall of the baked foodstuff with decorative granular members. The at least one shield is sized and dimensioned for blocking decorative granular members from the sidewall of specific foodstuff. The shield positions adjacent to the corresponding foodstuff to block discharged decorative granular members from engaging a region of the foodstuff other than the sidewall, such as the top region or back region.

In one aspect an assembly for uniform decoration of sidewall for baked foodstuff embodiments, comprises:
a spray gun comprising:
a housing defined by a rear end, a middle portion forming an upper inlet, and a front end terminating at an outlet;
a conduit coaxially and longitudinally disposed through the housing from the rear end to the front end, the conduit in communication with the upper inlet of the housing;
a container comprising an end wall and a continuous sidewall extending from the end wall and terminating at an opening, the end wall and the continuous sidewall defined by a cavity, the container configured to join with the middle portion of the housing such that the opening of the container is in communication with the upper inlet of the housing;
a regulation valve operational to variably open and close the communication between the opening of the container and the upper inlet of the housing;
a fan disposed at the rear end of the housing, the fan configured to generate air flow through the conduit from the rear end to the outlet at the front end of the housing;
at least one switch operatively connected to the fan, or the regulation valve, or both, the at least one switch configured to control the rate of the fan, or the position of the regulation valve, or both the rate and the position; and
at least one shield defined by a generally flat shape, the at least one shield operational with the spray gun, the at least one shield configured to selectively position in front of the outlet of the spray gun.

In another aspect, the rear end is generally wider than the front end.

In another aspect, further comprising a deflector disposed longitudinally through the conduit.

In yet another aspect, further comprising a screen adjacent and coplanar to the fan.

In yet another aspect, the handle is disposed opposite the inlet.

In yet another aspect, the at least one switch is disposed on the handle.

In yet another aspect, the at least one switch includes at least one of the following: a power switch for the fan, a fan speed switch, and a valve position switch.

In yet another aspect, the regulation valve comprises a disc that variably covers the inlet of the housing, the disc being manually operable with a rotatable cap.

In yet another aspect, at least one shield is generally flat.

In yet another aspect, at least one shield comprises a rectangular-shaped shield and a curved shield.

In yet another aspect, container is elongated.

In yet another aspect, the opening of the container is threaded.

In yet another aspect, the container contains a plurality of decorative granular members.

In yet another aspect, the plurality of decorative granular members include at least one of the following: sprinkles, nuts, fruit, chocolate chips, and candy.

In yet another aspect, the assembly is configured to decorate a sidewall of a baked foodstuff.

In yet another aspect, the spray gun discharges the plurality of decorative granular members on the sidewall of the baked foodstuff.

In yet another aspect, the at least one shield blocks the plurality of decorative granular members from engaging a top region of the baked foodstuff.

One objective of the present invention is to coat a sidewall of a baked foodstuff, such as a cake with a plurality of decorative granular members, while restricting coating other regions of the baked foodstuff, like the top region of the cake, with the decorative granular members.

Another objective is to easily apply the decorative granular members onto side portions of the cake which are generally vertical or in any case inclined is more difficult since it requires good manual skill and expertise.

Yet another objective is to regulate the rate of discharge, a uniform coating of the sidewall is possible. By blocking the path of discharge of decorative granular members on the top or back regions.

Yet another objective is to minimize waste from randomly discharged decorative granular members.

Yet another objective is to selectively control the pattern of discharge through a plurality of dispensing tips.

Yet another objective is to simultaneously control the velocity of air flow and the rate gravity feeding decorative granular members.

Yet another objective is to block decorative granular members from a top region of a cake.

Yet another objective is to provide a container that is easy to refill with decorative granular members.

Yet another objective is to provide an inexpensive assembly for controllably decorating cakes and desserts.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 4A shows a disc in the regulation valve in a closed position, and FIG. 4B shows the disc in a partially open position, in accordance with an embodiment of the present invention;

FIG. 6A shows a deflector, and FIG. 6B shows a screen, in accordance with an embodiment of the present invention;

Like reference numerals refer to like parts throughout the various views of the drawings.

DETAILED DESCRIPTION OF THE INVENTION

Figure 1:
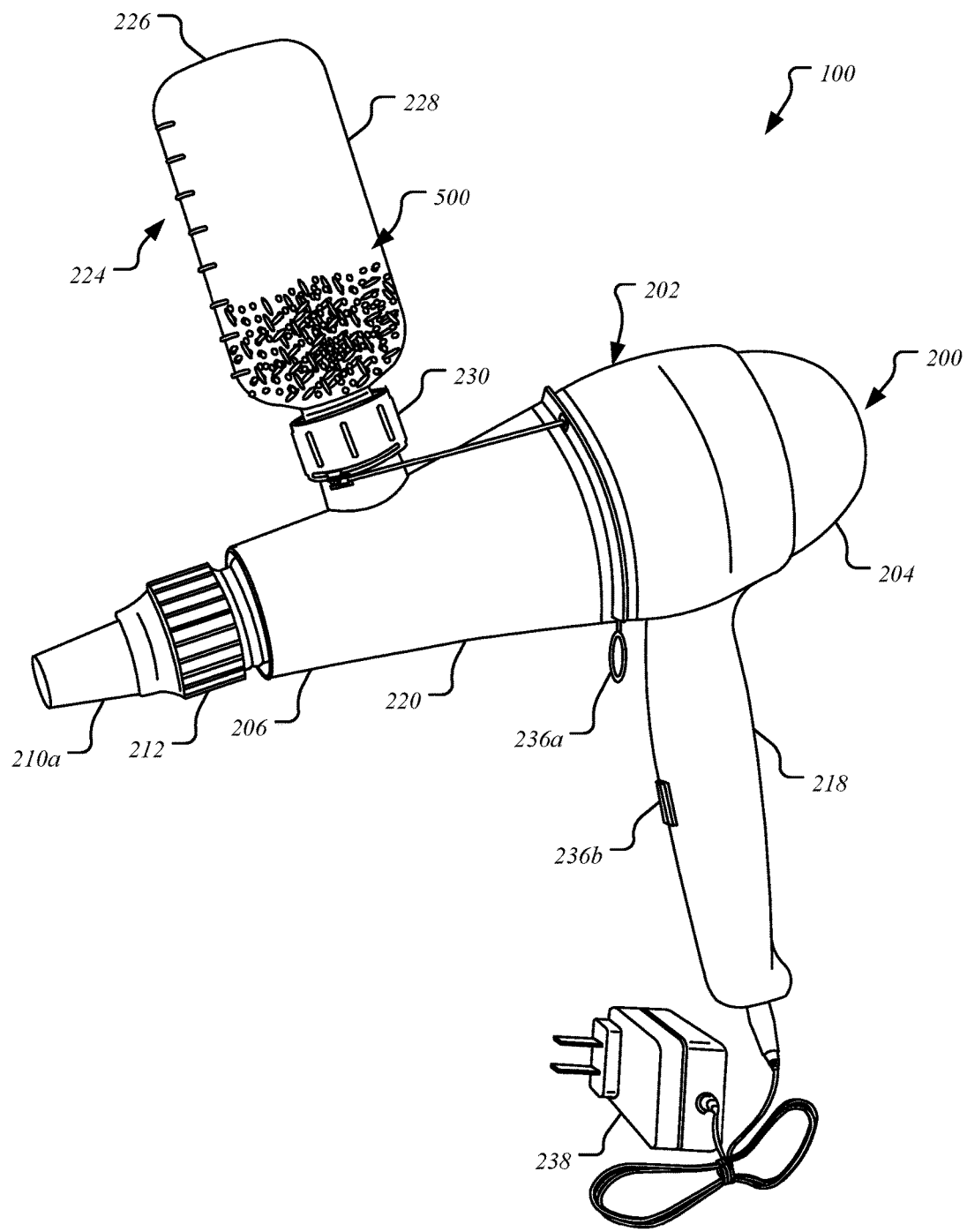
FIG. 1 illustrates a perspective view of an exemplary apparatus for uniform decoration of a sidewall for baked foodstuff, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An assembly 100 and method 400 for uniform decoration of the sidewall for foodstuff is referenced in FIGS. 1-10. In some embodiments, assembly 100 serves to coat a sidewall 504 of foodstuff 502a, 502b with a plurality of decorative granular members 500, while restricting coating the other regions of the foodstuff 502a, 502b, like the top region 506 of a cake, with the decorative granular members 500.

As FIG. 1 references, a spray gun 200 variably coats the foodstuff 502a, 502b with decorative granular members 500 at controllable rates of discharge, while at least one shield 300a, 300b blocks the decorative granular members 500 from the top region 506 of the foodstuff 502a, 502b, such that only the sidewall 504 of the foodstuff is coated with decorative granular members 500. Those skilled in the art will recognize that application of decorative granular members 500 onto side portions of the cake, which are generally vertical or in any case inclined, is more difficult since it requires good manual skill and expertise. Thus, the assembly 100 and method facilitates the decorative process.

Figure 8:
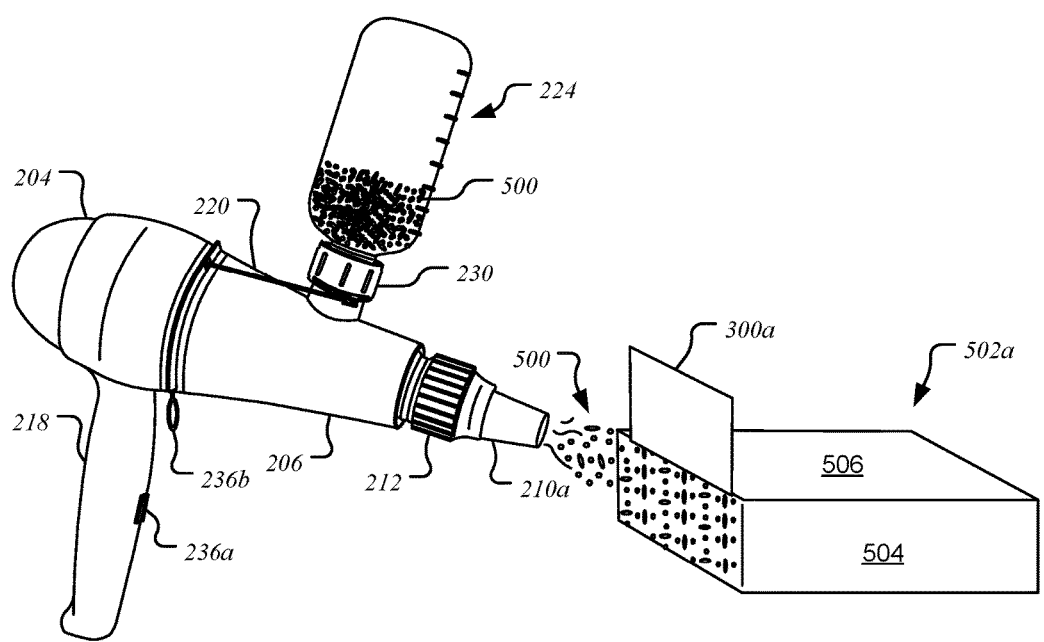
FIG. 8 illustrates a perspective view of the apparatus shown in FIG. 1, spraying the decorative granular members on a sidewall of a baked foodstuff, and a rectangular shield blocking the decorative granular members from a top region of the baked foodstuff, in accordance with an embodiment of the present invention.
Figure 9:
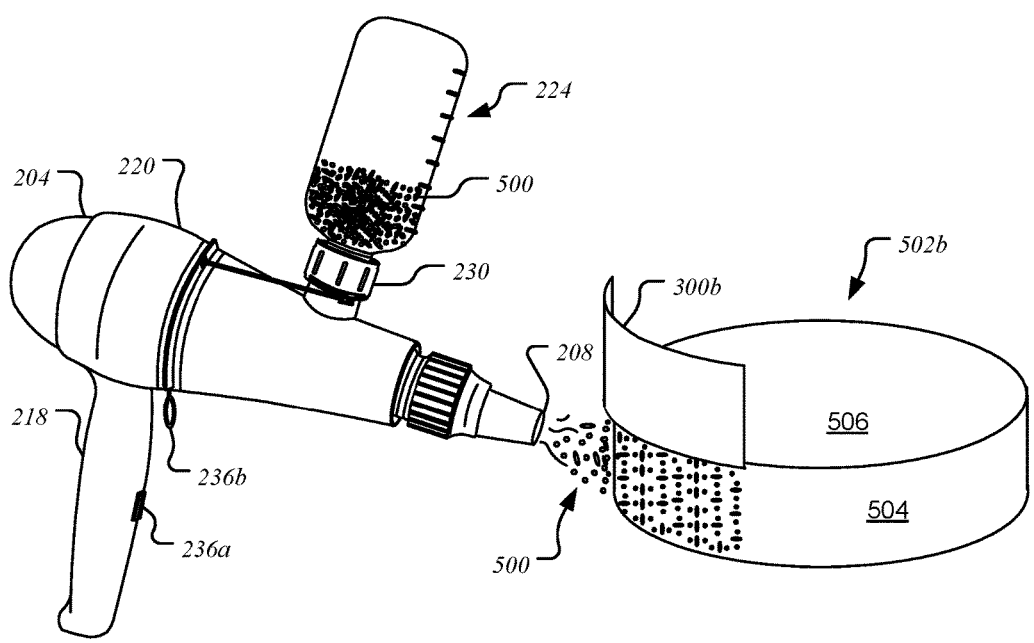
FIG. 9 illustrates a perspective view of the apparatus shown in FIG. 1, spraying the decorative granular members on a sidewall of a baked foodstuff, and a curved shield blocking the decorative granular members from a top region of the baked foodstuff, in accordance with an embodiment of the present invention.

Looking ahead to FIGS. 8 and 9, the foodstuff 502a, 502b may include a baked dessert, such as rectangular cake, round cake, cupcakes, and pies. However, any foodstuff 502a, 502b that is used in conjunction with decorative granular members 500 may be used, such as ice cream, carved meats, and mashed potatoes. The decorative granular members 500 may include, without limitation, confectionery, nuts, fruit, coconut, chocolate chips, and candy. Those skilled in the art will recognize that decorative granular members 500 are used as a decoration or to add texture to baked foodstuff 502a, 502b such as cupcakes, cookies, doughnuts, and ice cream. In some alternative embodiments, decorative granular members 500 are non-edible.

In some embodiments, assembly 100 comprises a spray gun 200 and at least one shield 300a, 300b that work together to simultaneously regulate the rate of discharge of decorative granular members 500 from spray gun 200 onto the sidewall 504 of foodstuff 502a, 502b, while blocking the discharge of the decorative granular members 500 onto other regions, such as a top region 506 or a back region of foodstuff 502a, 502b.

By regulating the rate of discharge, a uniform coating of the sidewall 228 is possible. By blocking the path of discharge of decorative granular members 500 on the top or back regions, greater control over the ornamental aspects of baked foodstuff is possible. Further, waste from randomly discharged decorative granular members 500 is also minimized, as the rate of discharge is controlled, and the path of discharged decorative granular members 500 is blocked from undesirable areas.

Figure 2:
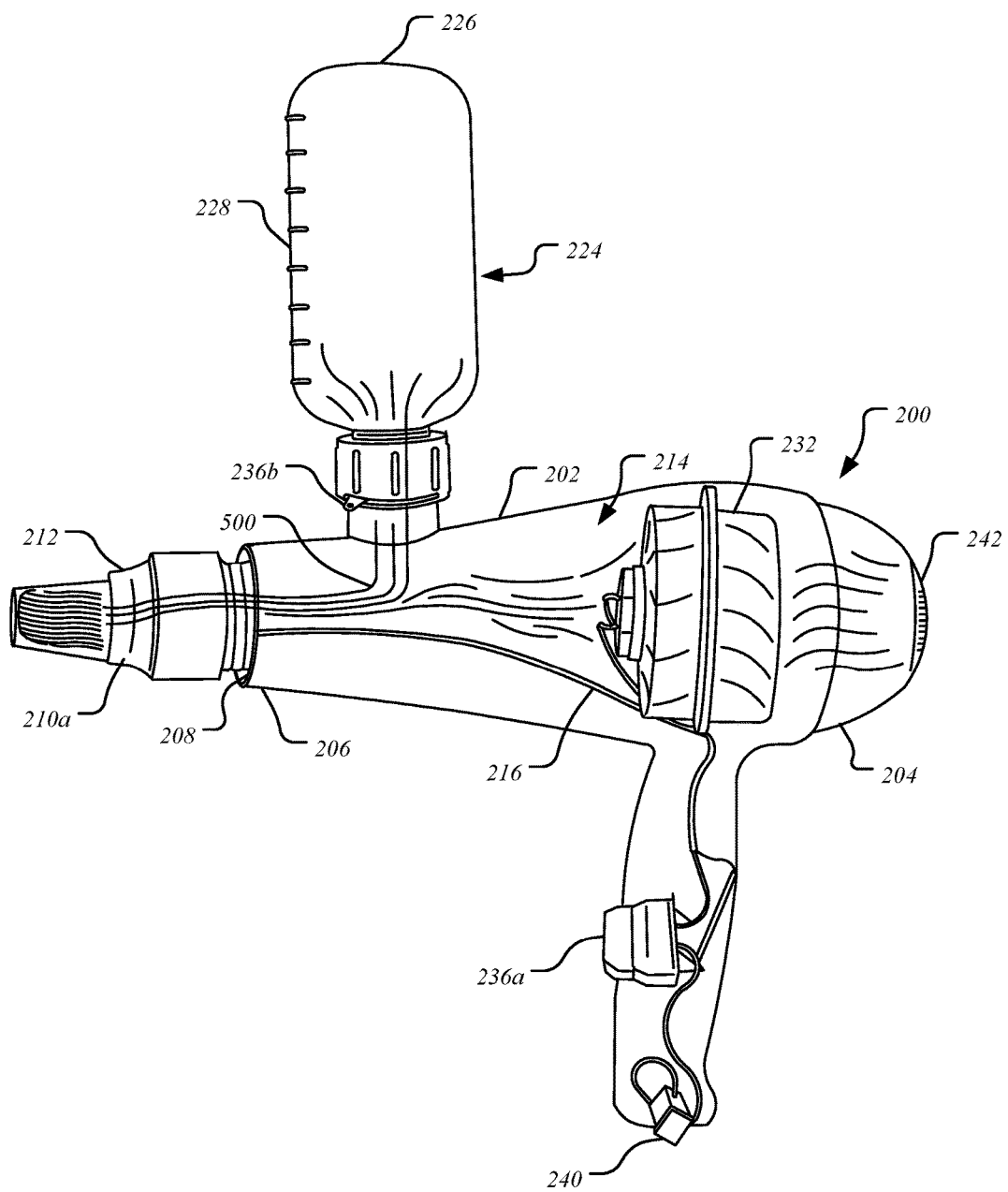
FIG. 2 illustrates a sectioned view of the apparatus for uniform decoration of a sidewall for baked foodstuff shown in FIG. 1, in accordance with an embodiment of the present invention.

Turning now to FIG. 2, assembly 100 comprises a spray gun 200 for discharging the decorative granular members 500. Spray gun 200 comprises a housing 202 having a wide rear end 204 and a narrow front end 206. Front end 206 forms an outlet 208 for discharge of the decorative granular members 500. A conduit 214 is coaxially and longitudinally disposed through the housing 202 from rear end 204 to front end 206 of housing 202. Conduit 214 is configured to carry decorative granular members 500. In an alternative embodiment, a deflector 216 is disposed longitudinally through the conduit 214. Deflector 216 helps guide the decorative granular members 500.

Housing 202 further comprises a middle portion 220 between the rear end 204 and the front end 206. The middle portion 220 forms an upper inlet 222 that is in communication with the conduit 214. A handle 218 may extend from the rear end 204 or middle portion 220 of the housing 202 to enable manipulation of the housing 202.

Figure 3:
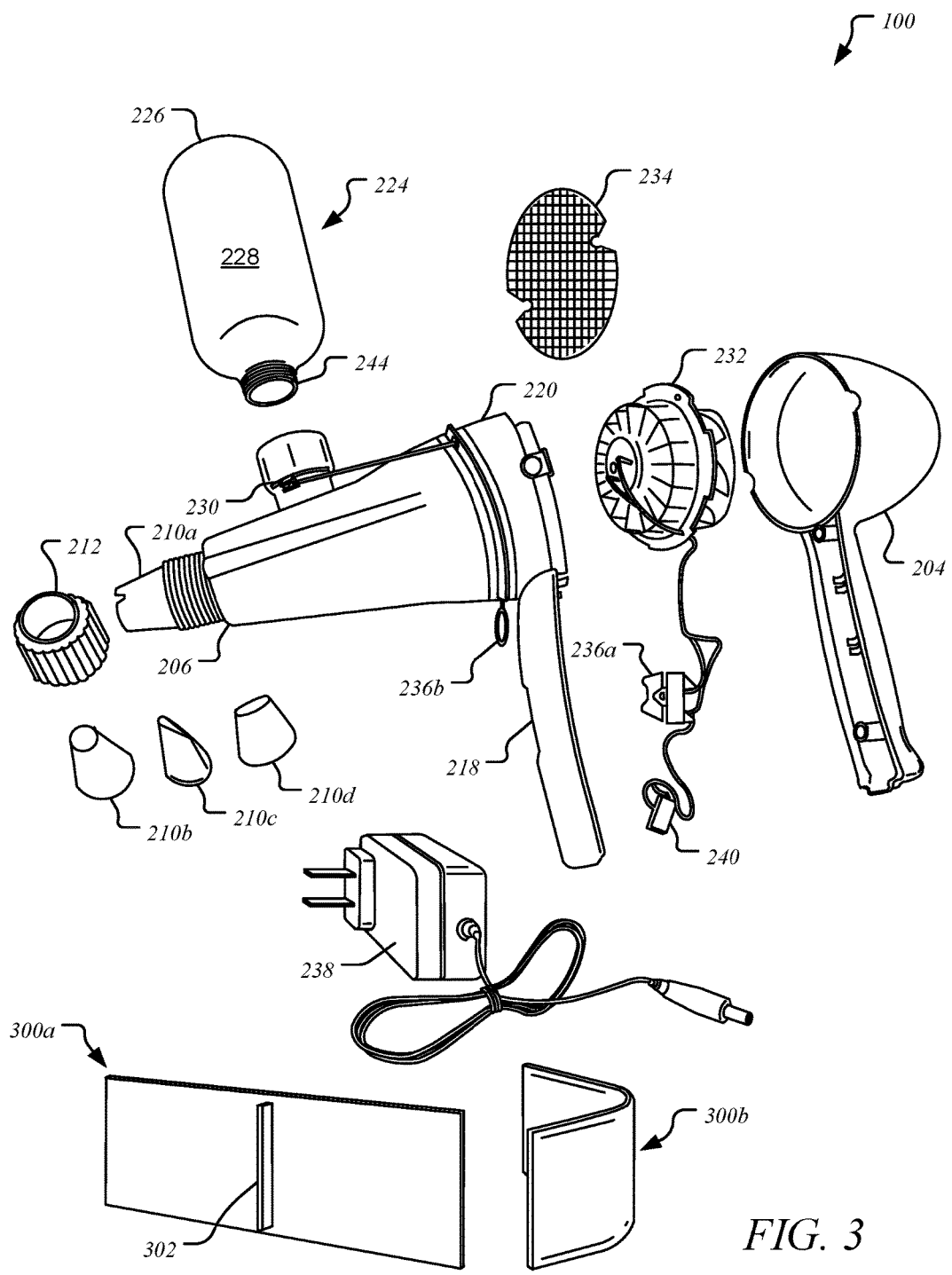
FIG. 3 illustrates a blow up view of the apparatus for uniform decoration of a sidewall for baked foodstuff shown in FIG. 1, in accordance with an embodiment of the present invention.

As shown in the blow up view of FIG. 3, spray gun 200 further comprises a container 224 that detachably attaches to the housing 202. Container 224 comprises an end wall 226 and a continuous sidewall 228 extending from the end wall 226 and terminating at an opening 244. End wall 226 and continuous sidewall 228 are defined by a cavity that is sized and dimensioned to contain the decorative granular members 500. Container 224 is configured to detachably couple to the middle portion 220 of housing 202, such that the opening 244 of container 224 is in communication with the upper inlet 222 of the housing 202 through a regulation valve 230. In one embodiment, opening 244 is threaded to rotatably attach to a threaded portion 246 of regulation valve 230. In this arrangement, container 224 is disposed generally above the housing 202, such that decorative granular members 500 are gravity fed into the conduit 214 of housing 202.

A plurality of dispensing tips 210a, 210b, 210c, 210d may detachably attach to the outlet 208 at the front end 206 of the housing 202. Dispensing tips 210a-d have various shapes and dimensions so as to be used to create different shape or discharge patterns for the decorative granular members 500. For example, dispensing tip 210a may have a wide base for attaching to the opening, and a narrow tip having various dimensions to extrude the decorative granular members 500 in various patterns and rates. Dispensing tip 210b may have a jagged edge. Dispensing tip 210c may have a wide tip. Dispensing tip 210d may have a curved tip. In some embodiments, a collar 212 may be used to secure dispensing tip 210a-d to outlet 208 at front end 206 of the housing 202. Collar 212 may be threaded to connect dispensing tip 210a to outlet 208.

In some embodiments, a regulation valve 230 is operational to variably open and close the communication between the opening 244 of container 224 and upper inlet 222 of housing 202. Regulation valve 230 regulates the rate of decorative granular members 500 allowed to fall into the conduit 214. The regulation valve 230 is rotatable, slidable, pivotable, or rolls to move between an open position, a closed position, and a position to partially obstruct decorative granular members 500 falling from the container 224 into the conduit 214. The position of regulation valve 230 may be controlled manually or from at least one switch 236a, 236b located in another area of the spray gun 200.

Figure 4A:
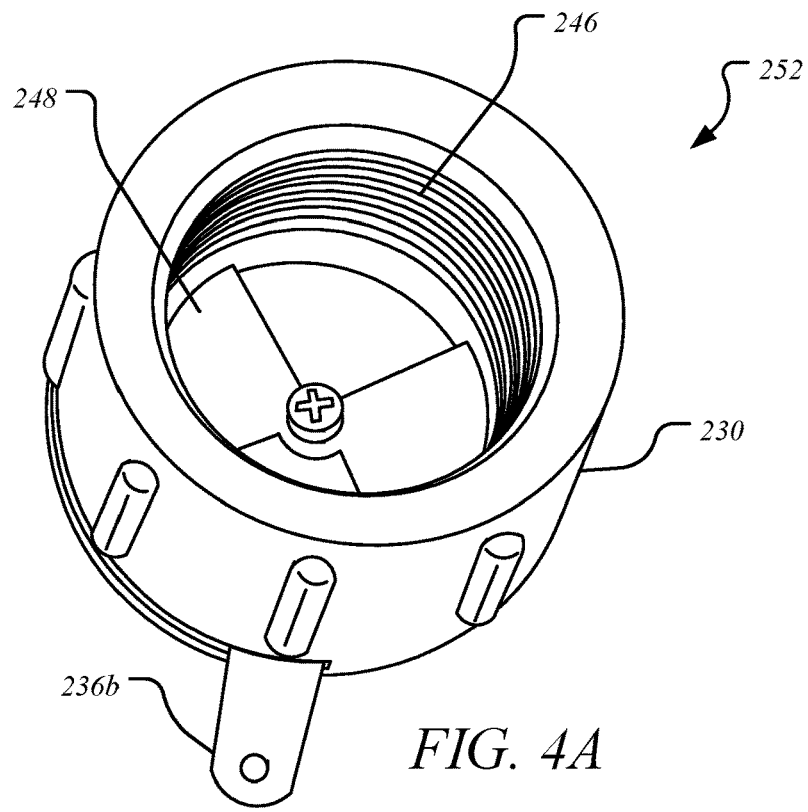
FIGS. 4A and 4B illustrate a regulation valve for discharging a plurality of decorative granular members on the sidewall of the baked foodstuff, where
Figure 4B:
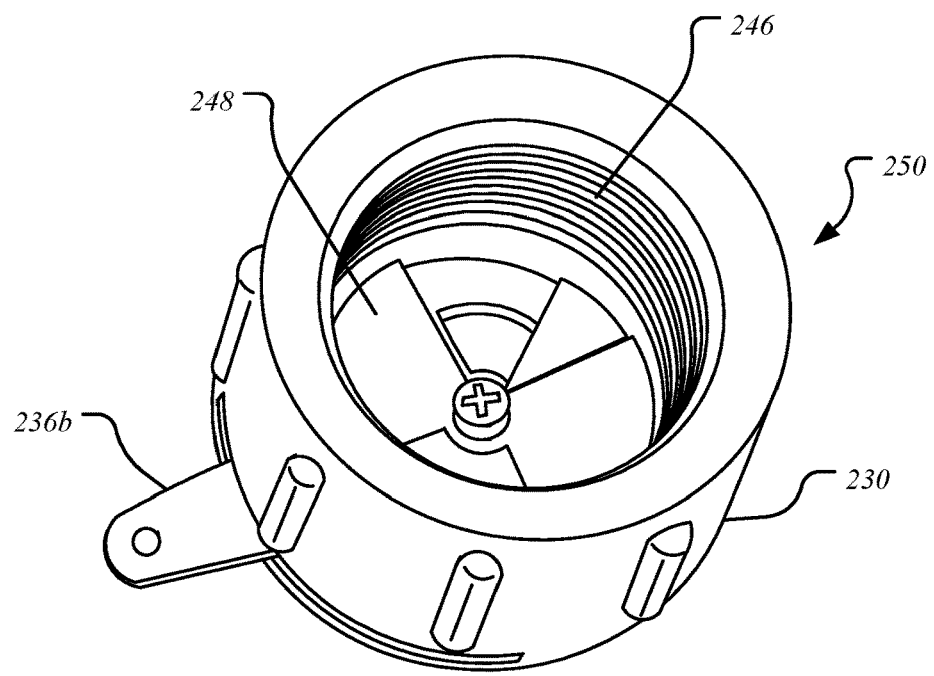

Looking at a first embodiment shown in FIGS. 4A and 4B, regulation valve 230 is a circular disc 248 that rotates coplanar to either all or a portion of the opening of the container 224 or all or a portion of the inlet 222 of the housing 202, or both. The disc is rotatably displaced through switch 236b from a closed position 252 (FIG. 4A) to a partially open position 252 (FIG. 4B) to release decorative granular embers 500 from container 224 into conduit 214 of housing 202. In a second embodiment, the regulation valve 230 is a ball that rolls over either all or a portion of the opening of the container 224 or all or a portion of the inlet 222 of the housing 202, or both. However in other embodiments, regulation valve 230 may utilize other mechanisms and valve known in the art to allow and restrict communication between the container 224 and the conduit 214. For example, regulation valve 230 may be electrical and operable with at least one switch 236a, 236b at the handle 218 of the housing 202.

Figure 5:
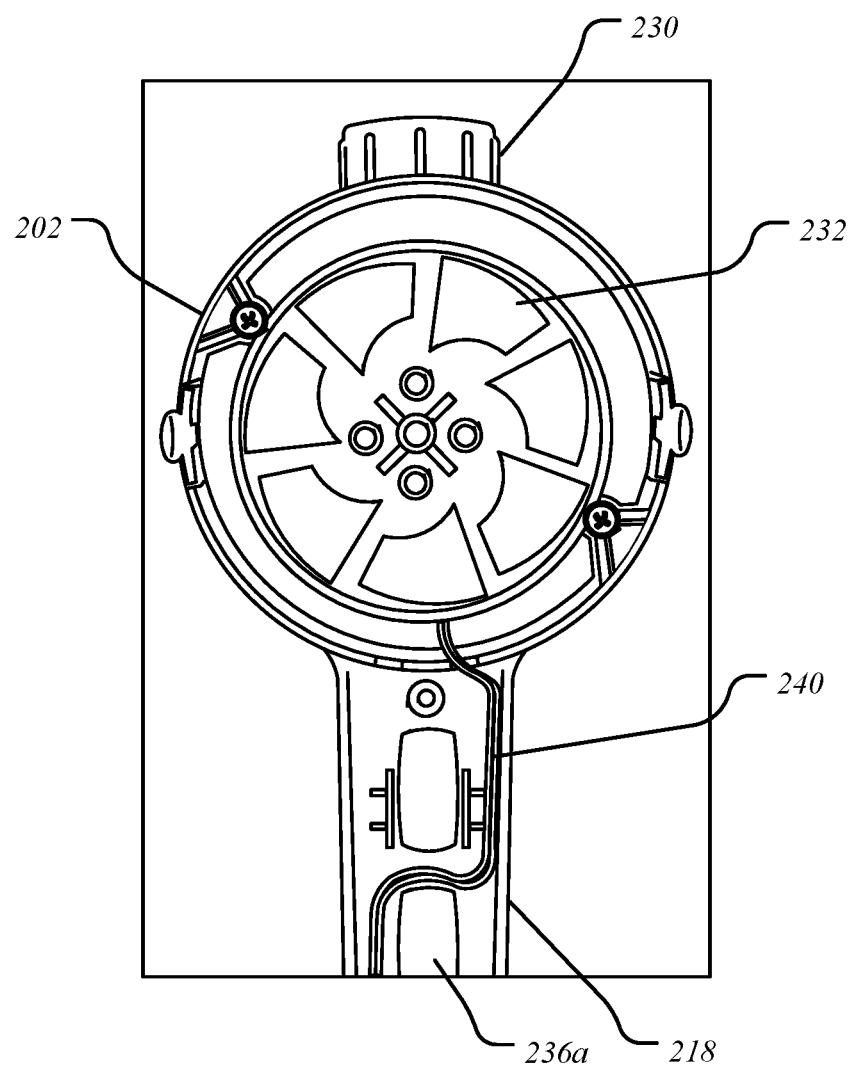
FIG. 5 illustrates a frontal view of a cavity in the apparatus, showing an exemplary fan for generating airflow through a conduit in the apparatus, in accordance with an embodiment of the present invention.
Figure 6A:
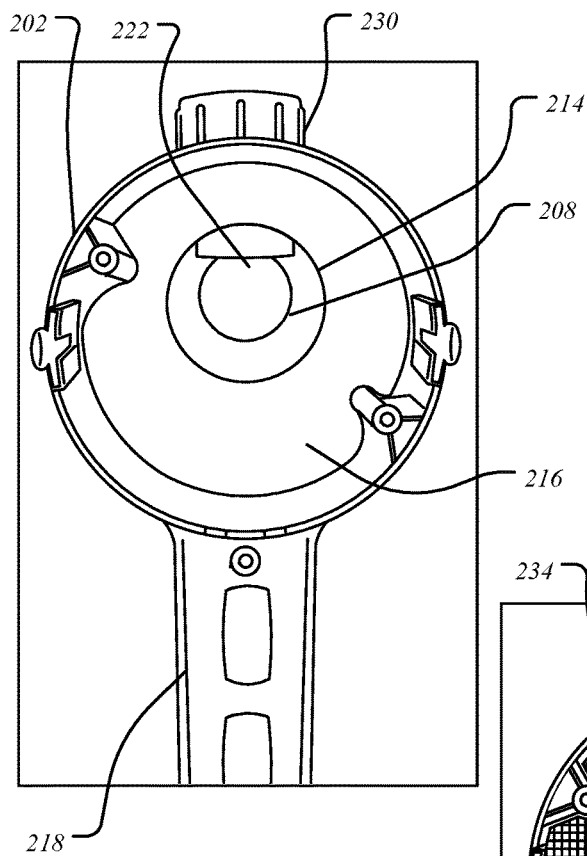
FIGS. 6A and 6B illustrate rear views of the conduit in the housing, where

As illustrated in FIG. 5, a fan 232 is disposed at the rear end 204 of the housing 202. Fan 232 generates air flow through the conduit 214, from the rear end 204 to the outlet 208 at the front end 206 of the housing 202 (FIG. 6A). Fan 232 generates sufficient air flow to carry the falling decorative granular members 500 past the opening in the container 224, and out through the outlet 208 at front end 206 of housing 202. Fan 232 may include an axis and a plurality of rotors, as known in the art. A vent 242 may be disposed at the rear end 204 of housing 202 to enable passage of intake air to fan 232.

Figure 6B:
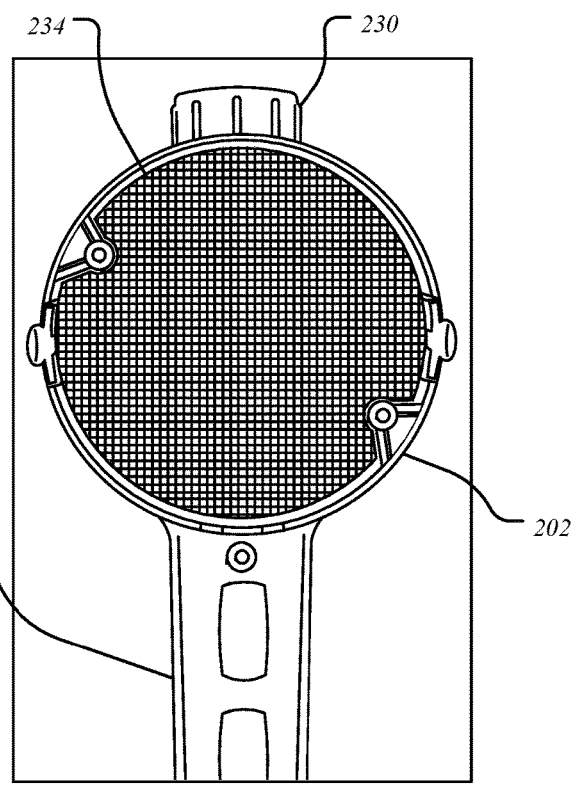
Figure 7:
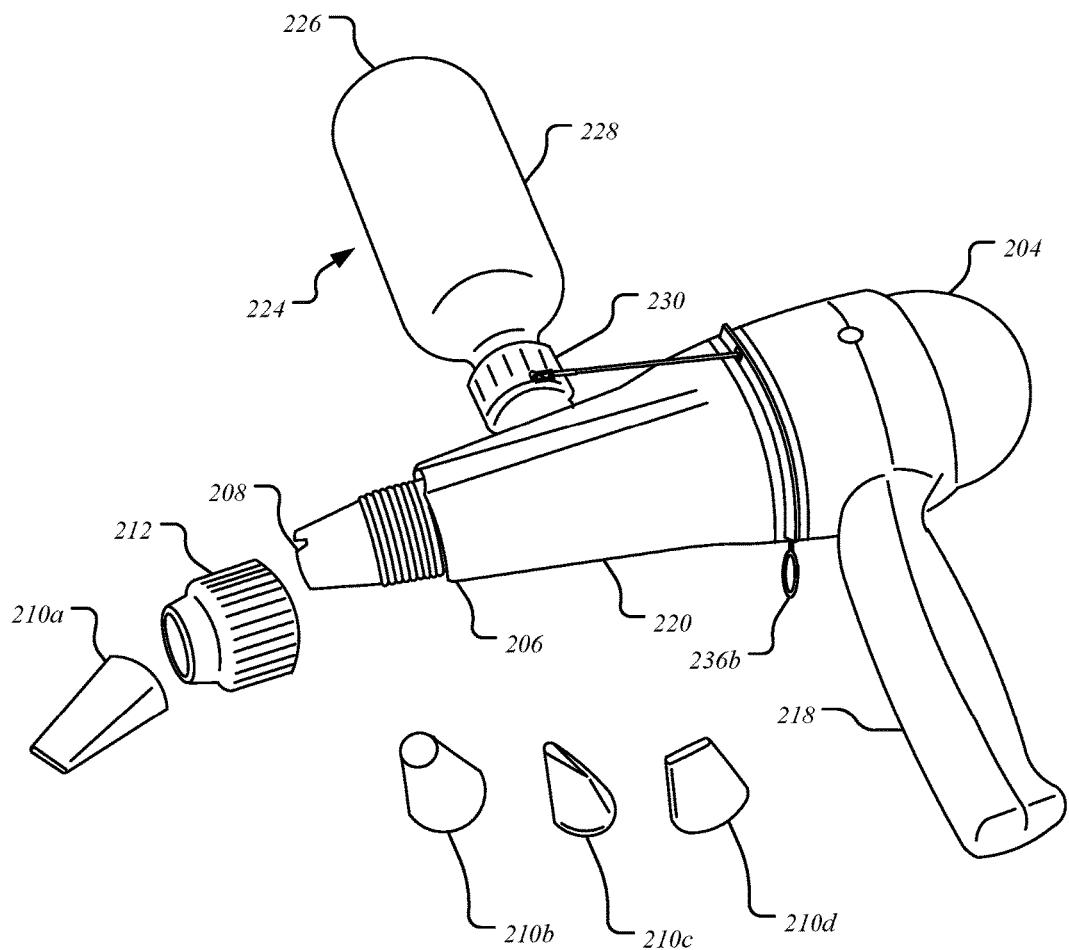
FIG. 7 illustrates a perspective view of the apparatus with a plurality of dispensing tips, in accordance with an embodiment of the present invention.

In one alternative embodiment shown in FIG. 6B, a screen 234 positions coplanar, and adjacent to the fan 232. Screen 234 may restrict backflow of decorative granular members 500 into the fan 232. In one embodiment, the powering on and off of the fan 232, and the air flow velocity generated by fan 232 is controllable with at least one switch 236a, 236b.

At least one switch 236a, 236b operatively connects the fan 232, or regulation valve 230, or both. In this manner, switch 236a, 236b variably controls the rate of air flow generated by the rotation of fan 232, or the position of regulation valve 230 over inlet 222, or both. In some embodiments, switch 236a, 236b may be disposed at handle 218, such that fan 232 may be controlled simultaneously with the rate of discharge of decorative granular members 500 through the regulation valve 230. In other embodiments, switch 236a, 236b may be disposed anywhere on housing 202. In yet another embodiment, switch 236a, 236b is remotely controlled.

Looking back at FIG. 2, switch 236a, 236b may include a finger trigger disposed centrally through the handle 218. In this arrangement, the trigger powers on and off fan 232. Switch 236a, 236b may also include a second trigger that controls the position of the regulation valve 230. However, switch 236a, 236b may also include a button, a lever, a pressure regulated sensor, and a toggle switch. In one exemplary embodiment, the at least one switch 236a, 236b includes at least one of the following: a power switch for the fan 232, a fan 232 speed switch, and a valve position switch.

In one embodiment, a power source 238 powers fan 232, or regulation valve 230, or both. Power source 238 may include a cable that plugs into an external power outlet. Though in some embodiments, power source 238 may include a direct current power supply, such as a battery, a rechargeable battery, or a solar panel. A circuitry 240 may be used to operatively connect at least one switch 236a, 236b to fan 232 and regulation valve 230. Circuitry 240 may include wires, resistors, and printed circuit boards.

Assembly 100 further comprises at least one shield 300a, 300b that works in conjunction with the spray gun 200 to coat the sidewall 504 of foodstuff 502a, 502b with decorative granular members 500. As discussed above, and as shown in FIG. 7, various dispensing tips 210a-d may be used to provide various patterns of decorative granular members 500 onto the sidewall 504. Each tip 210a-d operates independently to create different decorative designs.

In some embodiments, at least one shield 300a, 300b is sized and dimensioned for blocking decorative granular members 500 from the sidewall 504 of a specifically dimensioned foodstuff, such as a rectangular cake 502a or disc-shaped cake 502b. Shield 300a, 300b positions adjacent to the corresponding foodstuff 502a, 502b to block discharged decorative granular members 500 from engaging a region of foodstuff 502a, 502b other than the sidewall 504, such as the top or back regions 506. In some embodiments, shield 300a has a shield handle 302 disposed perpendicular to surface of shield 300a to enable manipulation and gripping of shield 300a.

In one embodiment shown in FIG. 8, shield 300a is flat and rectangular to block discharged decorative granular members 500 from the top region 506 of a square or rectangular shaped baked foodstuff 502a, i.e., rectangular sheet cake. In another embodiment shown in FIG. 9, shield 300b is curved to block discharged decorative granular members 500 from the top region 506 of a disc shaped baked foodstuff 502b, i.e., round cake. The curvature of shield 300b follows contour of disc-shaped cake. In yet other embodiments, other shaped and dimensions of shields may be used, depending on the dimensions and shape of foodstuff 502a, 502b.

Figure 10:
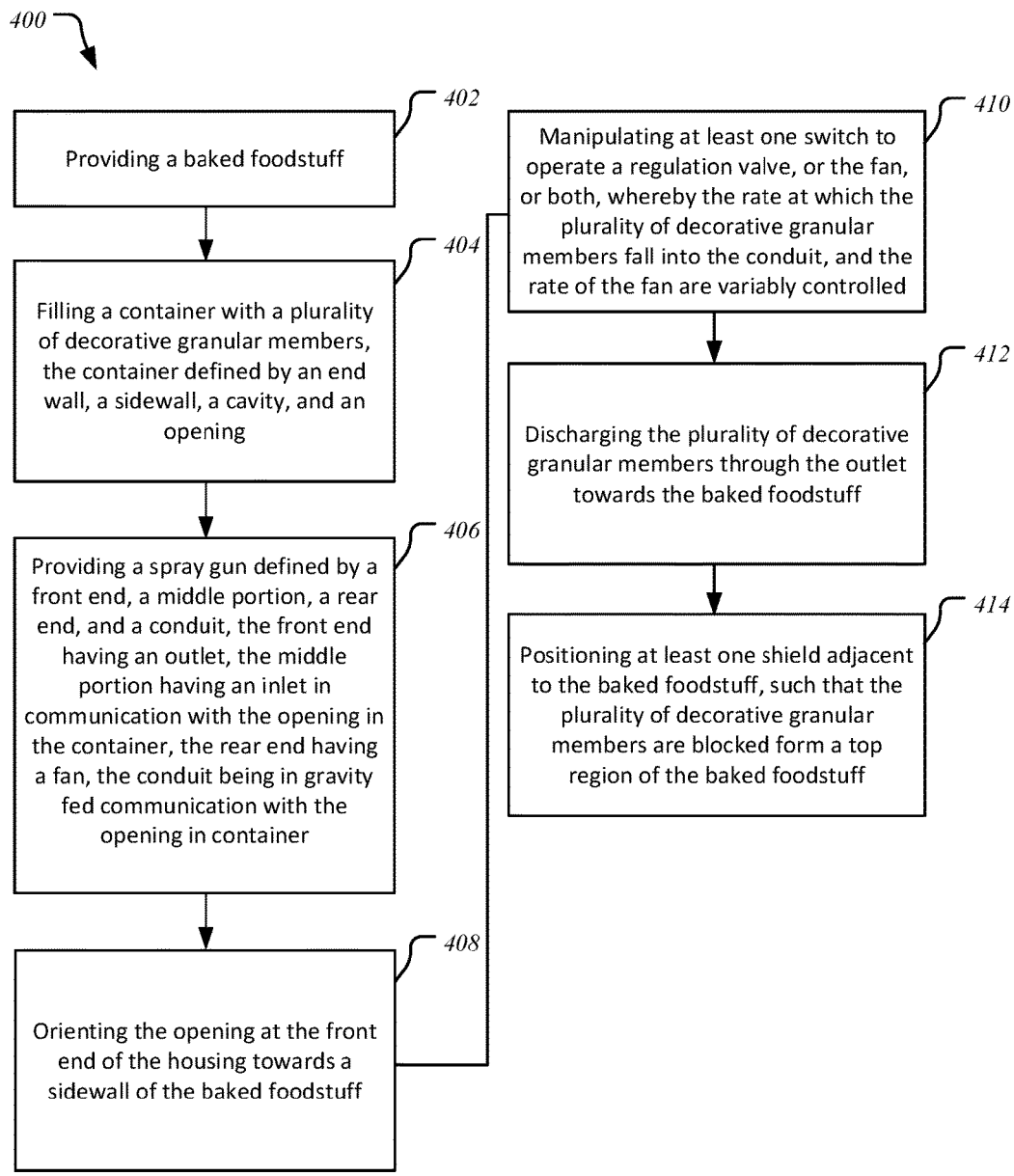
FIG. 10 illustrates a perspective view of an exemplary method for uniform decoration of a sidewall for baked foodstuff, in accordance with an embodiment of the present invention.

FIG. 10 illustrates a perspective view of an exemplary method 400 for uniform decoration of a sidewall 504 for baked foodstuff 502a, 502b. Method 400 enables uniform and efficient coating of a sidewall 504 of a foodstuff 502a, 502b, such as a cake, with a plurality of decorative granular members 500, while restricting coating other regions of the baked foodstuff 502a, 502b, like the top region 506 of a cake, with the granular members 500. Method 400 comprises an initial Step 402 of providing a baked foodstuff 502a, 502b.

A Step 404 may include filling a container 224 with a plurality of decorative granular members 500, the container 224 defined by an end wall 226, a sidewall 228, a cavity, and an opening. A Step 406 comprises providing a spray gun 200 defined by a front end 206, a middle portion 220, a rear end 204, and a conduit 214, the front end 206 having an outlet 208, the middle portion 220 having an inlet 222 in communication with the opening in the container 224, the rear end 204 having a fan 232, conduit 214 being in gravity fed communication with the opening in the container 224.

In some embodiments, a Step 408 may include orienting the opening at the front end 206 of the housing 202 towards a sidewall 504 of the baked foodstuff 502a, 502b. A Step 410 comprises manipulating at least one switch 236a, 236b to operate a regulation valve 230, or the fan 232, or both, whereby the rate at which the plurality of decorative granular members 500 fall into the conduit 214, and the rate of fan 232 are variably controlled.

In yet another embodiment, a Step 412 includes discharging the plurality of decorative granular members 500 through the outlet 208 towards the baked foodstuff 502a, 502b. A Step 414 comprises positioning at least one shield 300a, 300b adjacent to the baked foodstuff 502a, 502b, such that the plurality of decorative granular members 500 are blocked from coating a top region 506 of the baked foodstuff 502a, 502b.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An assembly for uniform decoration of sidewall for baked foodstuff, the assembly comprising:
   a spray gun comprising:
   a housing defined by a rear end, a middle portion forming an upper inlet, and a front end terminating at an outlet;
   a conduit coaxially and longitudinally disposed through the housing from the rear end to the front end, the conduit in communication with the upper inlet of the housing;
   a container comprising an end wall and a continuous sidewall extending from the end wall and terminating at an opening, the end wall and the continuous sidewall defined by a cavity, the container configured to join with the middle portion of the housing such that the opening of the container is in communication with the upper inlet of the housing;
   a regulation valve operational to variably open and close the communication between the opening of the container and the upper inlet of the housing;

a fan disposed at the rear end of the housing, the fan configured to generate air flow through the conduit from the rear end to the outlet at the front end of the housing;

at least one switch operatively connected to the fan, or the regulation valve, or both, the at least one switch configured to control the rate of the fan, or the position of the regulation valve, or both the rate and the position;

a plurality of dispensing tips detachably attachable to the outlet at the front end of the housing, the plurality of dispensing tips configured to create different shapes or discharge patterns for the plurality of decorative granular members;

the container configured to supply edible decorative granular members; and at least one shield, the at least one shield operational with the spray gun, the at least one shield configured to selectively position in front of the outlet of the spray gun.

2. The assembly of claim 1, wherein the rear end is generally wider than the front end.

3. The assembly of claim 1, further comprising a deflector disposed longitudinally through the conduit.

4. The assembly of claim 1, further comprising a screen disposed adjacent and coplanar to the fan.

5. The assembly of claim 1, wherein the handle is disposed opposite the inlet.

6. The assembly of claim 1, wherein the at least one switch is disposed on the handle.

7. The assembly of claim 1, wherein the at least one switch includes at least one of the following: a power switch for powering on and off the fan, a fan speed switch for regulating the velocity of the fan, and a valve position switch for controlling the position of the regulation valve relative to the inlet and the opening.

8. The assembly of claim 1, wherein the regulation valve comprises a disc that variably covers the upper inlet of the housing, the disc being manually operable with a rotatable cap.

9. The assembly of claim 1, wherein the at least one shield comprises a rectangular-shaped shield and a curved shield.

10. The assembly of claim 1, wherein the opening of the container is threaded.

11. The assembly of claim 1, wherein the container is configured to store and release the edible decorative granular members.

12. An assembly for uniform decoration of sidewall for baked foodstuff, the assembly comprising:

a spray gun comprising:

a housing defined by a rear end, a middle portion forming an upper inlet, and a front end terminating at an outlet;

a vent disposed at the rear end of the housing;

a conduit coaxially and longitudinally disposed through the housing from the rear end to the front end, the conduit in communication with the upper inlet of the housing;

a deflector disposed longitudinally through the conduit;

a container comprising an end wall and a continuous sidewall extending from the end wall and terminating at an opening, the end wall and the continuous sidewall defined by a cavity, the container configured to join with the middle portion of the housing such that the opening of the container is in communication with the upper inlet of the housing;

a regulation valve operational to variably open and close the communication between the opening of the container and the upper inlet of the housing;

a fan disposed at the rear end of the housing, the fan configured to generate air flow through the conduit from the rear end to the outlet at the front end of the housing;

a screen disposed adjacent and coplanar to the fan;

at least one switch operatively connected to the fan, or the regulation valve, or both, the at least one switch configured to control the rate of the fan, or the position of the regulation valve, or both the rate and the position;

wherein the at least one switch is a trigger that controls the position of the regulation valve and provides power to the fan;

a plurality of dispensing tips detachably attachable to the outlet at the front end of the housing, the plurality of dispensing tips configured to create different shapes or discharge patterns for the plurality of decorative granular members;

the container configured to supply edible decorative granular members; and at least one shield, the at least one shield operational with the spray gun, the at least one shield configured to selectively position in front of the outlet of the spray gun, the at least one shield comprising a shield handle configured to enable manipulation of the at least one shield.

13. The assembly of claim 12, wherein the at least one switch includes at least one of the following: a power switch for powering on and off the fan, a fan speed switch for regulating the velocity of the fan, and a valve position switch for controlling the position of the regulation valve relative to the inlet and the opening.

\* \* \* \* \*